(12) United States Patent
Stephenson et al.

(10) Patent No.: US 7,116,287 B2
(45) Date of Patent: Oct. 3, 2006

(54) DRIVE FOR CHOLESTERIC LIQUID CRYSTAL DISPLAYS

(75) Inventors: Stanley W. Stephenson, Spencerport, NY (US); David M. Johnson, West Henrietta, NY (US); Xiang-Dong Mi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 379 days.

(21) Appl. No.: 09/851,868

(22) Filed: May 9, 2001

(65) Prior Publication Data

US 2002/0186182 A1    Dec. 12, 2002

(51) Int. Cl.
*G09G 3/18* (2006.01)

(52) U.S. Cl. ............... 345/50; 345/38; 345/51; 345/54

(58) Field of Classification Search .......... 345/35, 345/95, 94, 211, 87, 210, 38, 50–54, 34; 349/169, 179
See application file for complete search history.

(56) References Cited

U.S. PATENT DOCUMENTS

| | | | |
|---|---|---|---|
| 4,139,278 A * | 2/1979 | Matsumoto et al. ........... 345/94 |
| 4,435,047 A | 3/1984 | Fergason ...................... 349/86 |
| 4,832,454 A * | 5/1989 | Walters ....................... 345/38 |
| 5,251,048 A | 10/1993 | Doane et al. ................. 345/87 |
| 5,437,811 A | 8/1995 | Doane et al. ........... 252/299.01 |
| 5,453,863 A | 9/1995 | West et al. ................... 349/35 |
| 5,503,952 A | 4/1996 | Suzuki et al. .................. 430/7 |
| 5,644,330 A * | 7/1997 | Catchpole et al. ............ 345/95 |
| 5,659,331 A * | 8/1997 | Oh et al. ...................... 345/95 |
| 5,695,682 A | 12/1997 | Doane et al. .......... 252/299.01 |
| 5,748,277 A | 5/1998 | Huang et al. ................ 349/169 |
| 6,118,439 A * | 9/2000 | Ho et al. ..................... 345/211 |
| 6,154,190 A * | 11/2000 | Yang et al. .................... 345/94 |
| 6,172,720 B1 * | 1/2001 | Khan et al. ................... 349/35 |
| 6,198,466 B1 * | 3/2001 | Morich et al. ................ 345/95 |
| 6,280,840 B1 * | 8/2001 | Luhmann et al. ............ 428/343 |
| 6,388,650 B1 * | 5/2002 | Maltese ....................... 345/94 |
| 6,459,418 B1 * | 10/2002 | Comiskey et al. .......... 345/107 |
| 6,717,561 B1 * | 4/2004 | Pfeiffer et al. ................ 345/87 |

* cited by examiner

*Primary Examiner*—Bipin Shalwala
*Assistant Examiner*—Prabodh Dharia
(74) *Attorney, Agent, or Firm*—Raymond L. Owens

(57) ABSTRACT

Apparatus for driving a cholesteric liquid crystal display wherein the display includes cholesteric liquid crystals having a first planar reflective state and a second transparent focal conic state, which is respectively responsive to different applied fields; an addressing structure having rows and columns of conductors arranged so that when a column and a row overlap, they define a selectable pixel or segment to be viewable or non-viewable; the apparatus being adapted to switch between a first and a second fixed voltage.

7 Claims, 11 Drawing Sheets

DRIVE FOR CHOLESTERIC LIQUID CRYSTAL DISPLAYS

CROSS REFERENCE TO RELATED APPLICATION

Reference is made to commonly assigned U.S. patent application Ser. No. 09/379,776, filed Aug. 24, 1999 by Dwight J. Petruchik et al., and U.S. patent application Ser. No. 09/723,389, filed Nov. 28, 2000 by David M. Johnson et al., the disclosures of which are incorporated herein by reference.

FIELD OF THE INVENTION

The present invention relates to the electrical drive for reflective memory displays.

BACKGROUND OF THE INVENTION

Currently, information can be displayed using assembled sheets of paper carrying permanent inks or displayed on electronically modulated surfaces such as cathode ray displays or liquid crystal displays. Other sheet materials can carry magnetically writable areas to carry ticketing or financial information, however magnetically written data is not visible.

Current flat panel displays use two transparent glass plates as substrates. In a typical embodiment, such as one set forth in U.S. Pat. No. 5,503,952, a set of electrical traces is sputtered in pattern of parallel lines that form a first set of conductive traces. A second substrate is similarly coated with a set of traces having a transparent conductive coating. Coatings are applied and the surfaces rubbed to orient liquid crystals. The two substrates are spaced apart and the space between the two substrates is filled with a liquid crystal material. Pairs of conductors from either set are selected and energized to alter the optical transmission properties of the liquid crystal material. Such displays are expensive, and currently are limited to applications having long lifetimes.

Fabrication of flexible, electronically written display sheets using conventional nematic liquid crystals materials is disclosed in U.S. Pat. No. 4,435,047. A first sheet has transparent indium-tin-oxide (ITO) conductive areas and a second sheet has electrically conductive inks printed on display areas. The sheets can be thin glass, but in practice have been formed of Mylar polyester. A dispersion of liquid crystal material in a binder is coated on the first sheet, and the second sheet is bonded to the liquid crystal material. Electrical potential is applied to opposing conductive areas to operate on the liquid crystal material and expose display areas. The display uses nematic liquid crystal materials, which ceases to present an image when de-energized. Privacy windows are created from such materials using the scattering properties of conventional nematic liquid crystals. Nematic liquid crystals require continuous electrical drive to remain transparent.

U.S. Pat. No. 5,437,811 discloses a light-modulating cell having a chiral nematic liquid crystal in polymeric domains contained by conventional patterned glass substrates. The chiral nematic liquid crystal has the property of being driven between a planar state reflecting a specific visible wavelength of light and a light scattering focal conic state. Chiral nematic material has the capacity of maintaining one of the given states in the absence of an electric field.

In "Liquid Crystal Dispersions", World Science, Singapore, 1995, page 408, Paul Drzaic discusses the electrical drive of cholesteric liquid crystal displays. Drzaic also states on page 29 that "The use of gelatin, however, creates a material that is too conductive for practical use in electrically addressed PDLC systems.". Drzaic further states " . . . actual displays require AC signals to prevent electrochemical degradation." Subsequent patents follow Drzaic's assumptions. Later patents such as U.S. Pat. Nos. 5,251,048 and 5,644,330 and 5,748,277 all require AC fields having a net zero unipolar field for matrix cholesteric liquid crystal displays to prevent ionic destruction of the display. The cited patents have display structures formed using expensive display structures and processes applicable to long-life situations which require AC drive schemes.

The drive schemes require that each element be written using alternating electrical fields that provide a net zero field across the display to prevent ionic migration. AC drives require large numbers of power supplies and large numbers of switching elements per line.

Simple cholesteric memory displays with limited write lines requires a simple electronic writer. Such writer is preferably a single, inexpensive drive chip that is commercially available.

SUMMARY OF THE INVENTION

It is an object of the present invention to provide a drive for low cost memory displays generated using coated polymeric dispersed cholesteric liquid crystals on flexible substrates.

It is another object of the present invention to provide a simpler, lower cost method of driving coated polymer dispersed cholesteric materials on flexible substrates.

These objects are achieved by an apparatus for driving a cholesteric liquid crystal display comprising:

a) the display including cholesteric liquid crystals having a first planar reflective state and a second transparent focal conic state, which is respectively responsive to different applied fields;

b) an addressing structure having rows and columns of conductors arranged so that when a column and a row overlap, they define a selectable pixel or segment to be viewable or non-viewable;

c) means for switching between a first and a second fixed voltage;

d) voltage divider means responsive to the first and second fixed voltages for providing one of two selectable voltages for each column and one of two selectable voltages for each row; and e) means for selecting one of the first and second fixed voltages for causing the voltage divider means to provide one of two voltages for a column and one of the two voltages for a row so that a voltage for a particular pixel or segment which will cause such pixel or segment to be in a transparent or reflective state.

The invention reduces the number of voltages required to drive such a display as well as reducing the number of voltage switching elements and power supplies. It is a feature of the present invention that it can require a single drive chip and single power supply to write a display.

DETAILED DESCRIPTION OF THE INVENTION

Figure 1:
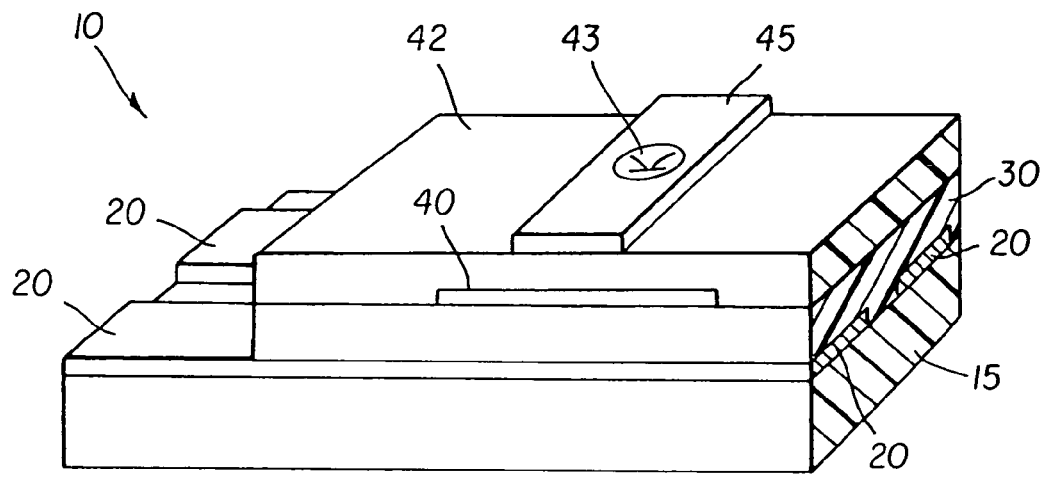
FIG. 1 is an isometric partial view of a cholesteric liquid crystal display made in accordance with the present invention.

FIG. 1 is an isometric partial view of a new structure for a display 10 made in accordance with the invention. Display 10 includes a flexible substrate 15, which is a thin transparent polymeric material, such as Kodak Estar film base formed of polyester plastic that has a thickness of between 20 and 200 microns. In an exemplary embodiment, substrate 15 can be a 125 micron thick sheet of polyester film base. Other polymers, such as transparent polycarbonate, can also be used.

First patterned conductors 20 are formed over substrate 15. First patterned conductors 20 can be tin-oxide or indium-tin-oxide (ITO), with ITO being the preferred material. Typically the material of first patterned conductors 20 is sputtered as a layer over substrate 15 having a resistance of less than 250 ohms per square. The layer is then patterned to form first patterned conductors 20 in any well known manner. Alternatively, first patterned conductors 20 can be an opaque electrical conductor material such as copper, aluminum or nickel. If first patterned conductors 20 are opaque metal, the metal can be a metal oxide to create light absorbing first patterned conductors 20. First patterned conductors 20 are formed in the conductive layer by conventional lithographic or laser etching means.

A polymer dispersed cholesteric layer 30 overlays first patterned conductors 20. Polymer dispersed cholesteric layer 30 includes a polymeric dispersed cholesteric liquid crystal material, such as those disclosed in U.S. Pat. No. 5,695,682, the disclosure of which is incorporated by reference. Application of electrical fields of various intensity and duration can drive a chiral nematic material (cholesteric) into a reflective state, to a transmissive state, or an intermediate state. These materials have the advantage of maintaining a given state indefinitely after the field is removed. Cholesteric liquid crystal materials can be Merck BL112, BL118 or BL126, available from E.M. Industries of Hawthorne, N.Y.

In the preferred embodiment, polymer dispersed cholesteric layer 30 is E.M. Industries' cholesteric material BL-118 dispersed in deionized photographic gelatin. The liquid crystal material is dispersed at 8% concentration in a 5% deionized gelatin aqueous solution. The mixture is dispersed to create 10 micron diameter domains of the liquid crystal in aqueous suspension. The material is coated over a patterned ITO polyester sheet to provide a 9 micron thick polymer dispersed cholesteric coating. Other organic binders such as polyvinyl alcohol (PVA) or polyethylene oxide (PEO) can be used. Such compounds are machine coatable on equipment associated with photographic films.

Second patterned conductors 40 overlay polymer dispersed cholesteric layer 30. Second patterned conductors 40 should have sufficient conductivity to carry a field across polymer dispersed cholesteric layer 30. Second patterned conductors 40 can be formed in a vacuum environment using materials such as aluminum, tin, silver, platinum, carbon, tungsten, molybdenum, tin or indium or combinations thereof The second patterned conductors 40 are as shown in the form of a deposited layer. Oxides of said metals can be used to darken second patterned conductors 40. The metal material can be excited by energy from resistance heating, cathodic arc, electron beam, sputtering, or magnetron excitation. Tin-oxide or indium-tin oxide coatings permit second patterned conductors 40 to be transparent.

In a preferred embodiment, second patterned conductors 40 are printed conductive ink such as Electrodag 423SS screen printable electrical conductive material from Acheson Corporation. Such printed materials are finely divided graphite particles in a thermoplastic resin. The second patterned conductors 40 are formed using printed inks to reduce cost display. The use of a flexible support for substrate 15, laser etching to form first patterned conductors 20, machine coating polymer dispersed cholesteric layer 30, and printing second patterned conductors 40 permits the fabrication of very low cost memory displays. Small displays formed using these methods can be used as electronically rewritable tags for inexpensive, limited rewrite applications.

A dielectric can be printed over second patterned conductors 40 and have openings through vias that permit interconnection between second patterned conductors 40 and conductive traces that form traces to define rows 45. Rows 45 can be the same screen printed electrically conductive material used to form second patterned conductors 40.

Figure 2:
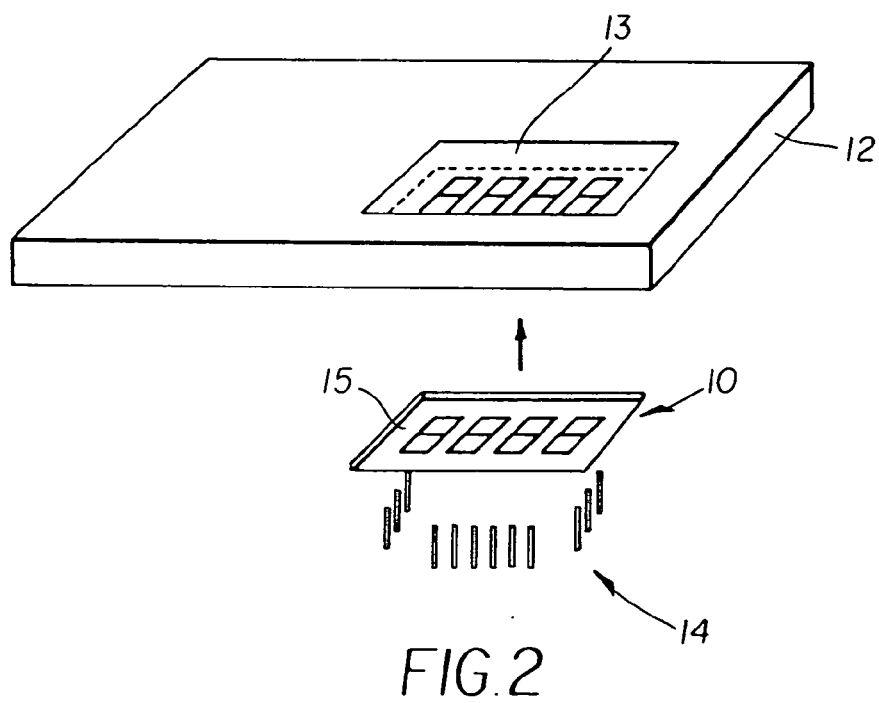
FIG. 2 is an assembly diagram of the display in FIG. 1 being attached to a card.

FIG. 2, an assembly diagram of display 10 in FIG. 1, is attached to a card 12. Card 12 can be a transparent sheet, approximately 0.5 millimeter in thickness which has information printed on one surface. A non-printed area 13 provides a clear window for viewing the contents of display 10, which has been bonded to the opposite side of card 12. Display 10 in this example has a transparent substrate 15, and is inverted from the position shown in FIG. 1 during the attachment process. Information written to display 10 is seen through non-printed area 13 of card 12 and through transparent substrate 15. Card 12 with attached display 10 can be inserted into a holder (not shown) and contacts 14 can connect during the insertion process to first patterned conductors 20 and rows 45 on display 10 to update information on display 10. Display 10 can be used a financial transaction (credit/debit) card typically requiring less than 10,000 updated images.

Figure 3A:
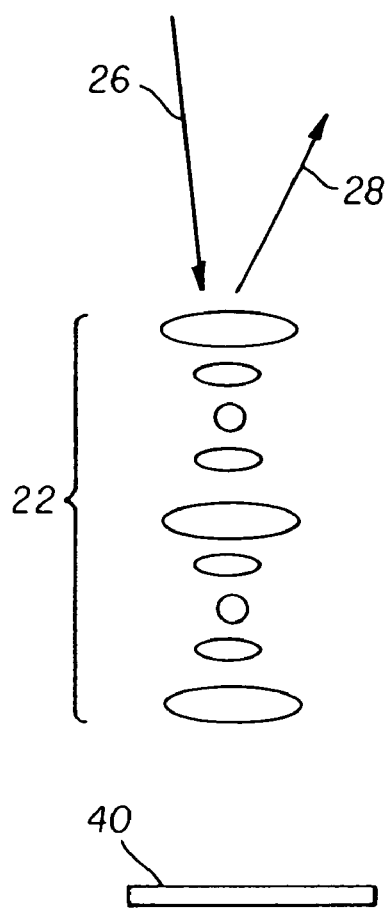
FIG. 3A is a schematic sectional view of a chiral nematic material in a planar state reflecting light.
Figure 3B:
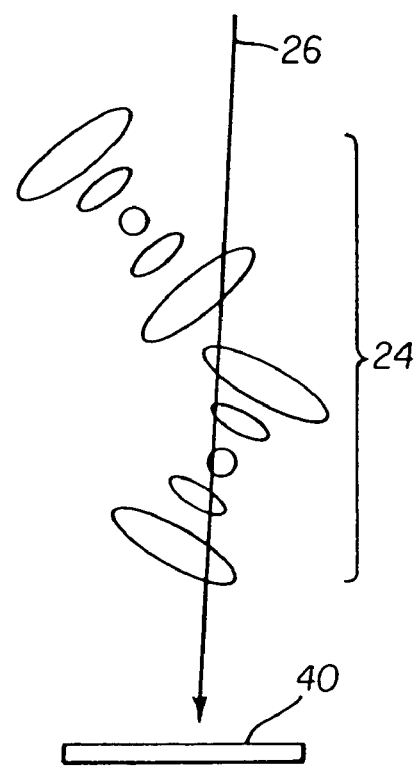
FIG. 3B is a schematic sectional view of a chiral nematic material in a focal conic state transmitting light.

FIG. 3A and FIG. 3B show two stable states of cholesteric liquid crystals. In FIG. 3A, a high voltage field has been applied and quickly switched to zero potential, which converts cholesteric liquid crystal to a planar state 22. Incident light 26 striking cholesteric liquid crystal in planar state 22 is reflected as reflected light 28 to create a bright image. In FIG. 3B, application of a lower voltage field leaves cholesteric liquid crystals in a transparent focal conic state 24.

Whenever incident light 26 strikes a cholesteric liquid crystal in focal conic state 24, such light is transmitted. Second patterned conductors 40 can be black which will absorb incident light 26 to create a dark image when the liquid crystal material is in focal conic state 24. As a result, a viewer perceives a bright or dark image depending on if the cholesteric material is in planar state 22 or focal conic state 24, respectively.

Figure 4:
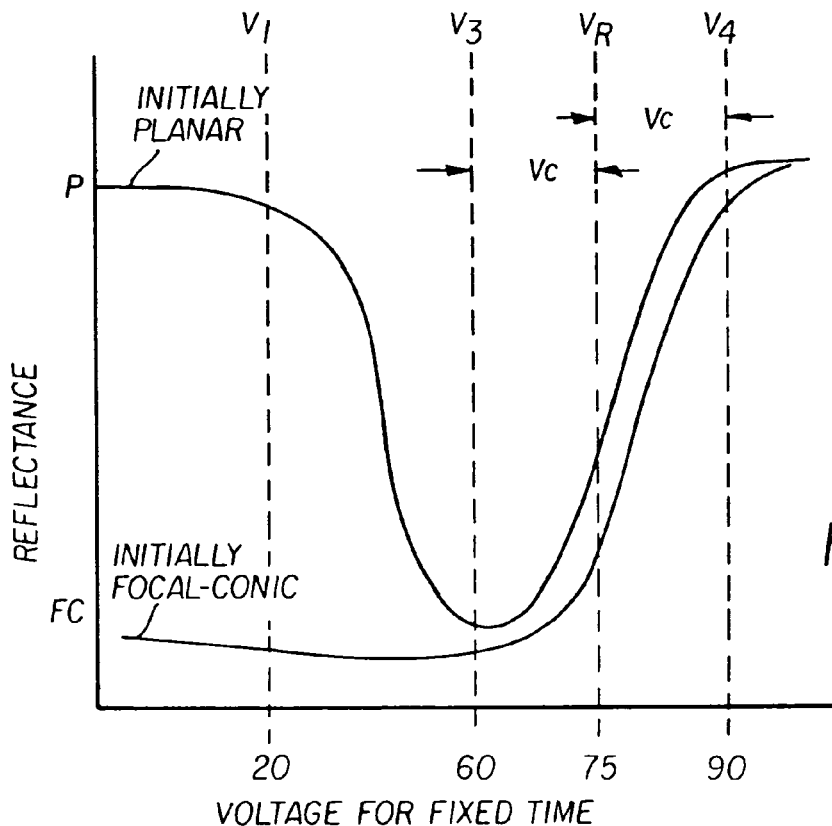
FIG. 4 is a plot of the response of a first polymer dispersed cholesteric material to a pulsed electrical field with a first set of imposed voltages.

FIG. 4 is a plot of the response of a cholesteric material to a pulsed electrical field. Such curves can be found in U.S. Pat. Nos. 5,453,863 and 5,695,682 and are also found in the above-cited Drzaic reference. For a given pulse time, typically between 5 and 200 milliseconds, a pulse at a given voltage can change the optical state of a cholesteric liquid crystal. The prior art written for cholesteric displays covers displays built using expensive conventional flat panel display processes. Consequently, current state of the art requires bipolar voltage drive schemes for cholesteric displays to prevent ionic damage. The bipolar drives require at least two voltages and two separate semiconductor switching elements for each drive line.

In an experiment, gelatin dispersed cholesteric material dispersed and coated to the preferred embodiment was coated over ITO coated flexible substrate 15 to form polymer dispersed cholesteric layer 30. A one inch square conductive patch was printed over the gelatin dispersed cholesteric material to provide a field across the coating. A 20 millisecond unipolar field was switched across display 10 every 5 seconds to switch the state of the material between the planar and focal conic states. The gelatin dispersed cholesteric material was driven through a limited life test of 10,000 rewrites. The life testing was equivalent to 200 seconds of continuous applied unipolar voltage to display 10. The test patch operated with no apparent visible degradation throughout the life test. The life test was then extended to 100,000 cycles. The test display 10 continued to perform with little degradation. From this experiment, it was concluded that polymeric dispersed cholesteric materials on flexible substrates 15 with printed conductors can be driven by unipolar (DC) fields for at least the limited number of life cycles needed for limited-life display applications. Such displays benefit from a drive scheme that uses inexpensive, simple switching chips operating on a single voltage.

Figure 5:
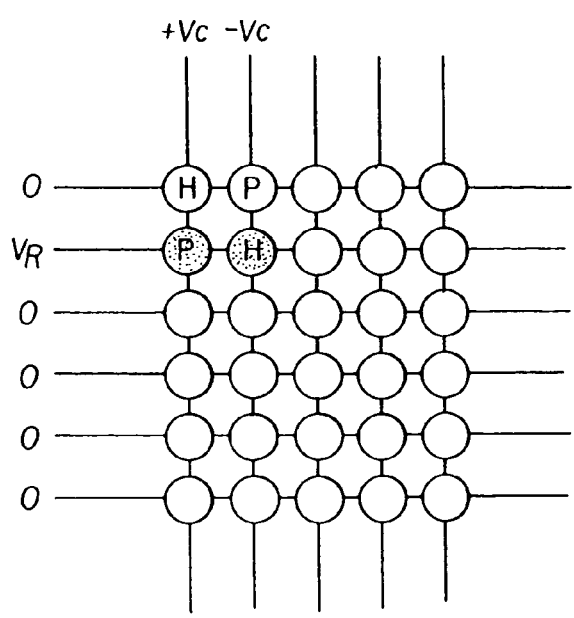
FIG. 5 is a schematic representation of a matrix array of cholesteric liquid crystal elements.

FIG. 5 is a schematic representation of a matrix array of cholesteric liquid crystal elements written using a unipolar drive scheme. Row voltage VR is set midway between V3 and V4 on a selected row while the remaining rows are set to a ground voltage. A positive or negative column voltage Vc is set across all columns 47 to offset VR to either focal conic voltage V3 or planar voltage V4, depending on the desired final state of a row of pixels. The positive and negative column voltages VR–V3 and V4–VR are less than disturbance voltage V1 so that rows at ground potential experience voltages less than disturbance voltage V1 and are not changed. These material characteristics permit sequential row writing.

Figure 6:
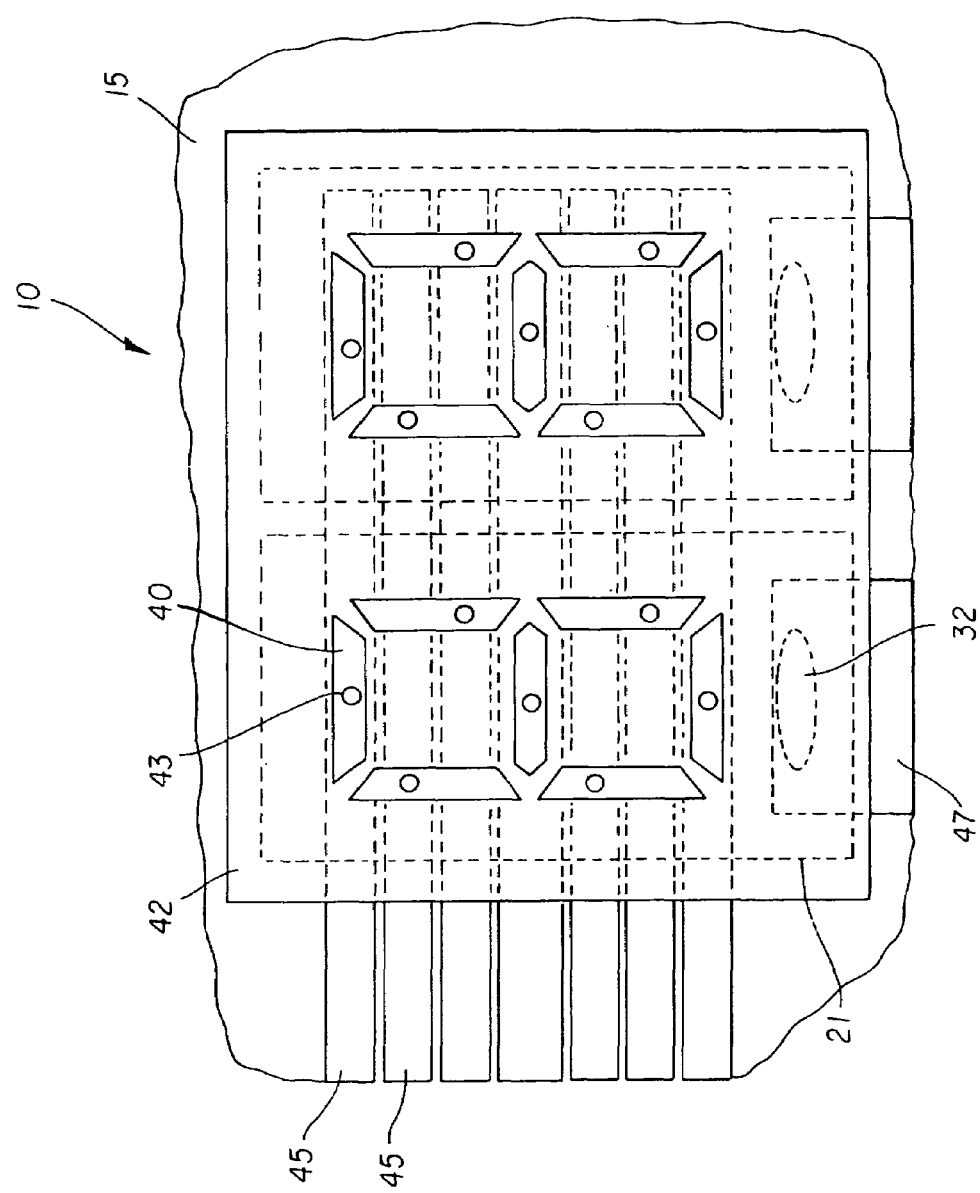
FIG. 6 is a front view of the display of FIG. 1.

FIG. 6 is a front view of particular embodiment of display 10 having a matrix addressing structure in accordance with the present invention. In this embodiment display 10 has two seven-segment characters that have been built so that segments from each character are connected to form seven rows and transparent electrodes under each character acting as columns 47. Looking through substrate 15, a transparent conducting layer has etch lines 21 which define first patterned conductor 20, which are transparent conductive electrodes over each seven-segment character. Polymer dispersed cholesteric layer 30 is coated behind patterned first conductors 20. A portion of polymer dispersed cholesteric material 30 is removed to form connection area 32 for each character. Second patterned conductors 40 were printed to form the seven segments of each character within the boundaries of first patterned conductor 20. Dielectric 42 was printed across the display and has through vias to permit electrical connection to each character segment formed by second patterned conductor 40. A final layer of conductive material was printed across the back of the display to form rows 45 and columns 47. The completed display is an addressable matrix cholesteric display. Display 10 has seven rows 45 and two columns 47 for each of two characters, for a total of less than nine driven lines. It is advantageous to drive display 10 with a single driver chip. Where one of the column 47 and the second patterned conductor 40 connected to row 45 overlap, they define a selectable pixel or segment to be viewable or non-viewable.

Figure 7:
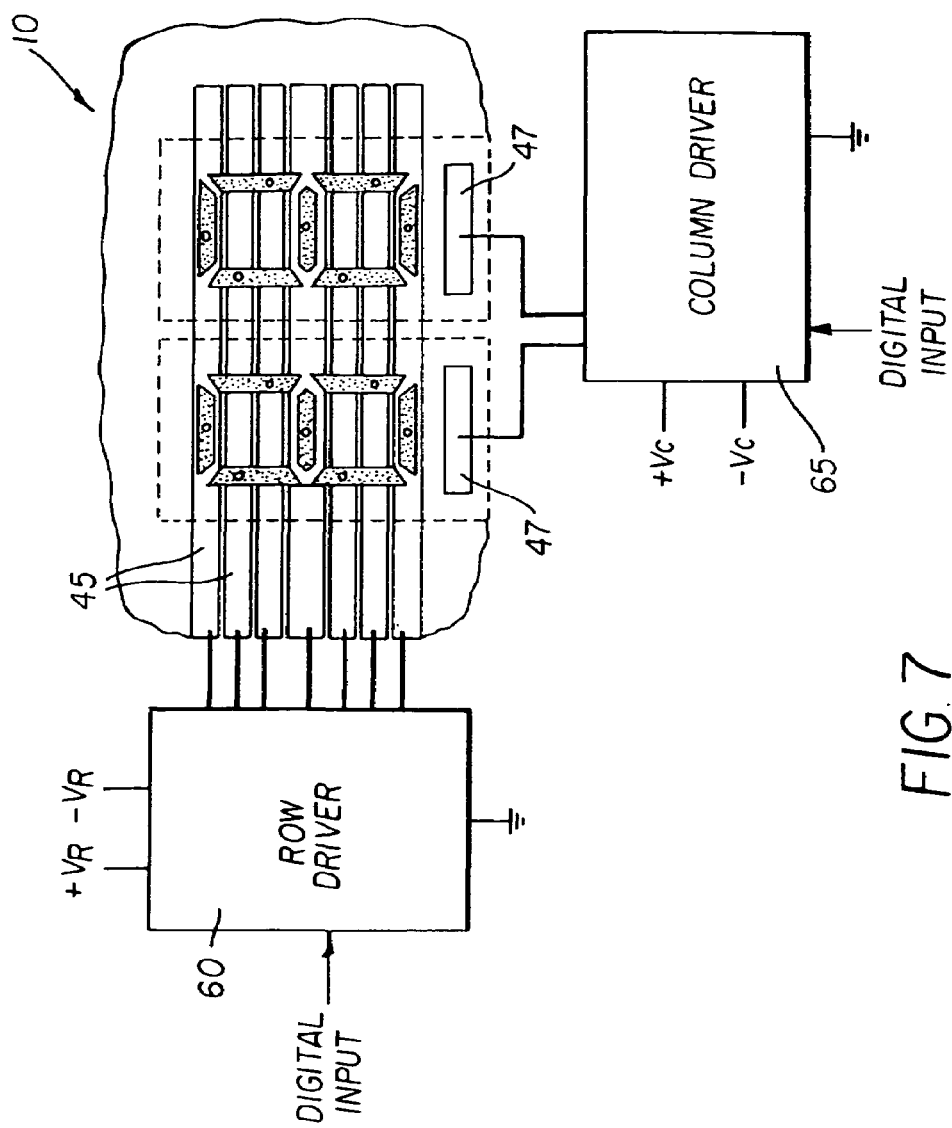
FIG. 7 is an electrical schematic of prior art drive for the display of FIG. 1.

FIG. 7 is an electrical schematic of typical prior art used to drive the display of FIG. 1 based on the teaching in U.S. Pat. No. 5,644,330. Four power supplies are needed to supply +Vc, −Vc, +VR, −VR and ground. Each line output of must switch one of three voltages to each line of a matrix display. Conventional bipolar drive schemes, as disclosed in U.S. Pat. No. 5,748,277, require the use of expensive analog switching elements 55 as found in a Supertex HV204 8-Channel High Voltage Analog Switch. One analog switch is required for each voltage applied to each trace of the display. Such expensive chips prohibit low cost commercialization. Even more complex switching schemes have been proposed which increase the number of power supplies and analog switches are disclosed in other patents, such as U.S. Pat. No. 5,748,277.

Figure 8:
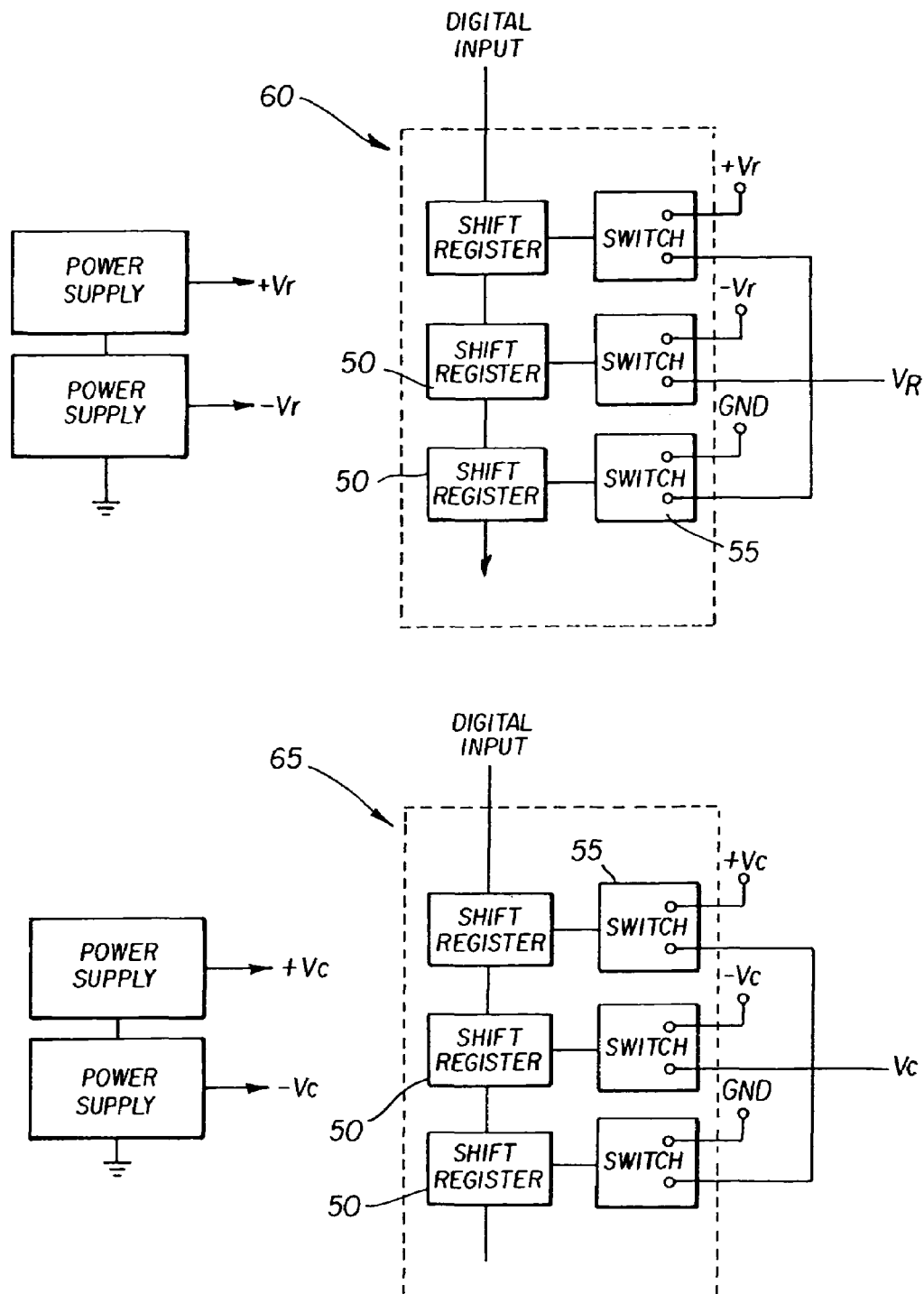
FIG. 8 is a schematic of the prior art drive of FIG. 7.

FIG. 8 is a more detailed view of the drive used in FIG. 7. Four power supplies are needed to supply +Vc, −Vc, +VR, −VR and ground. Separate drive chips, row driver 60 and a column driver 65 are required for the rows and column voltages. Digital data is fed to row driver 60 and column driver 65. A set of shift registers in the drivers receives and latches binary state data. The latched data control the operation of switches 55, which are high voltage bilateral DMOS switches. Multiple switches 55 must be combined to provide multiple voltages to each row or column of display 10.

Figure 9:
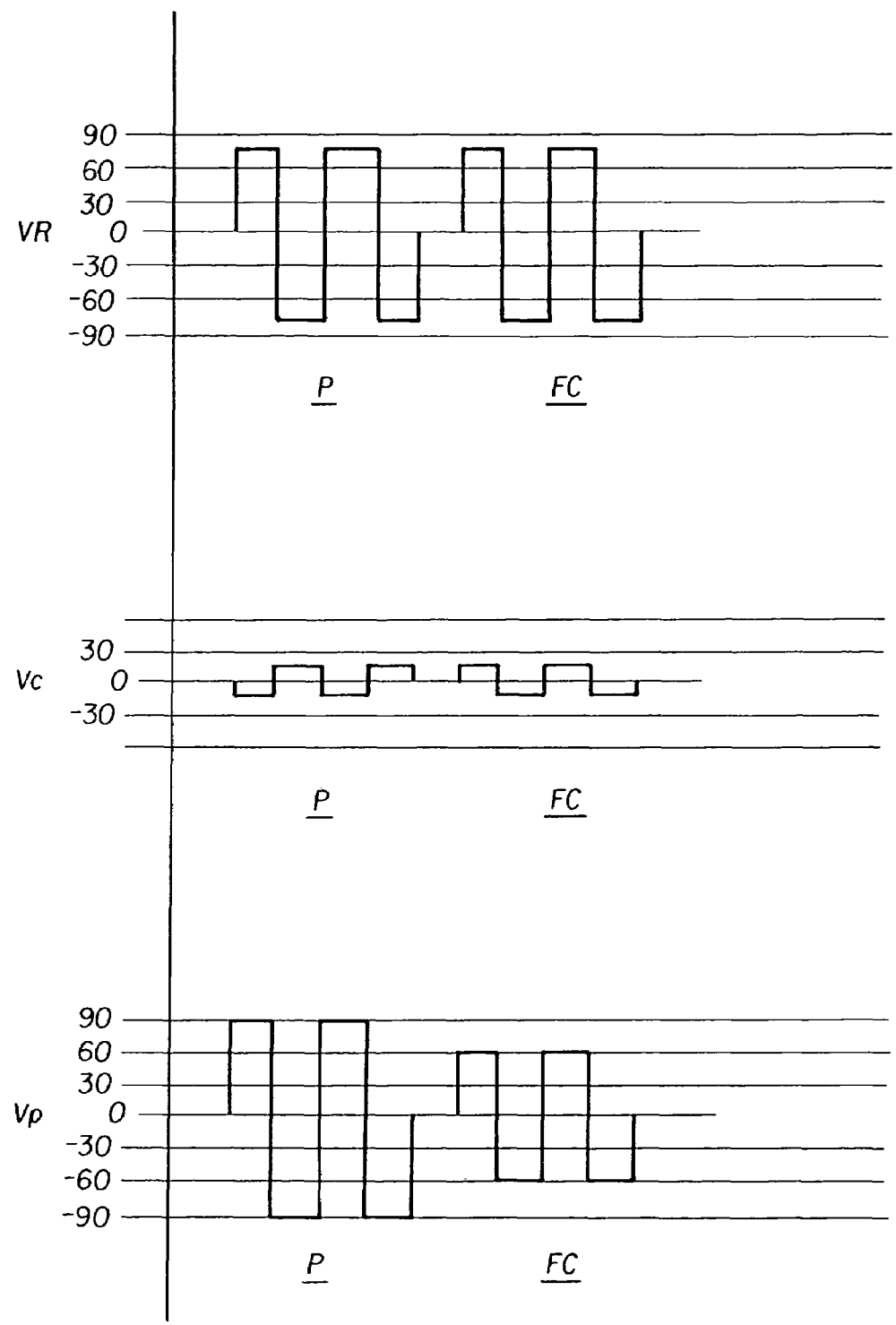
FIG. 9 is a diagram of the waveforms generated by prior art to drive the display of FIG. 1.

FIG. 9 is a diagram of the waveforms used by prior art using the bipolar drive scheme shown in FIG. 7. A bipolar row voltage VR can be applied to a selected row, while a bipolar column voltage Vc is applied either in phase or out of phase with the row voltage VR. If the bipolar voltages are out of phase, the pixel will experience alternating bipolar high pixel voltage Vp corresponding to V4 and be written into the planar state (P). If the two voltages are in phase, then a pixel experiences lower alternating bipolar pixel voltage Vp corresponding to V3 and is written into the focal conic state (FC). Columns 47 held at a ground state (0) experience a bipolar alternating column voltage Vc as an alternating AC field equivalent to half the voltage difference between V4 and V3. Column voltage is less than disturbance voltage V1 to preserve the image state of unwritten, grounded rows.

Figure 10:
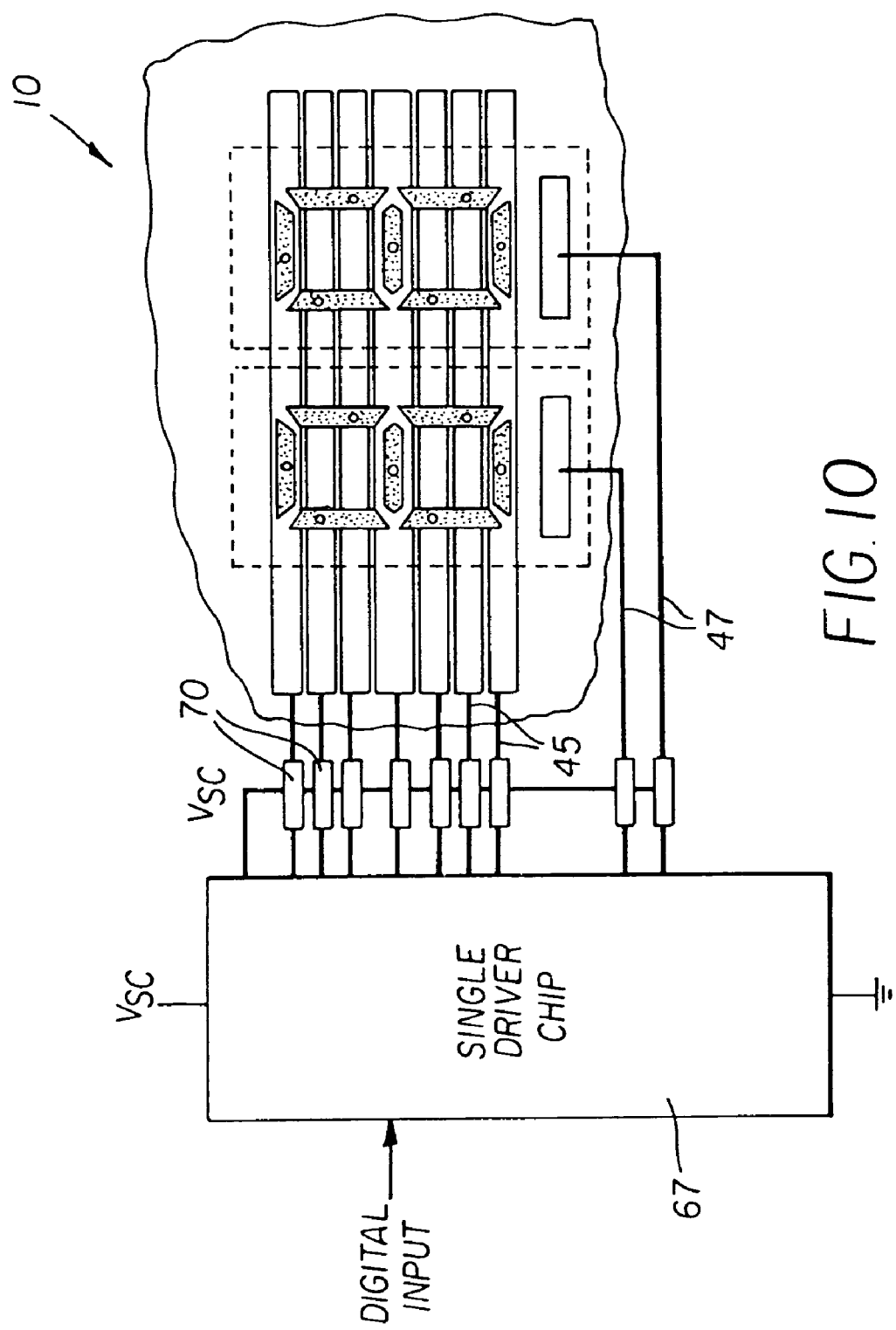
FIG. 10 is an electrical schematic the new drive scheme operating on the display of FIG. 1.

A schematic of a drive scheme in accordance with the current invention is shown in FIG. 10. A single driver chip 67 is used to apply unipolar fields to display 10 using passive components 70. Instead of expensive analog switches, the new drive uses simple push-pull outputs to switch a set of outputs between a fixed high voltage, in the exemplary embodiment 90 volts, and second lower voltage, which in the example is ground. Such a chip can be the STV7699 plasma display driver from ST Microelectronics, which has a set of 64 output lines controlled by a set of shift registers 50 which switches each output 56 between single chip voltage or ground. In the exemplary embodiment, disturbance voltage V1 is 20 volts, focal conic voltage V3 is 60 volts and planar voltage V4 is 90 volts.

Figure 11:
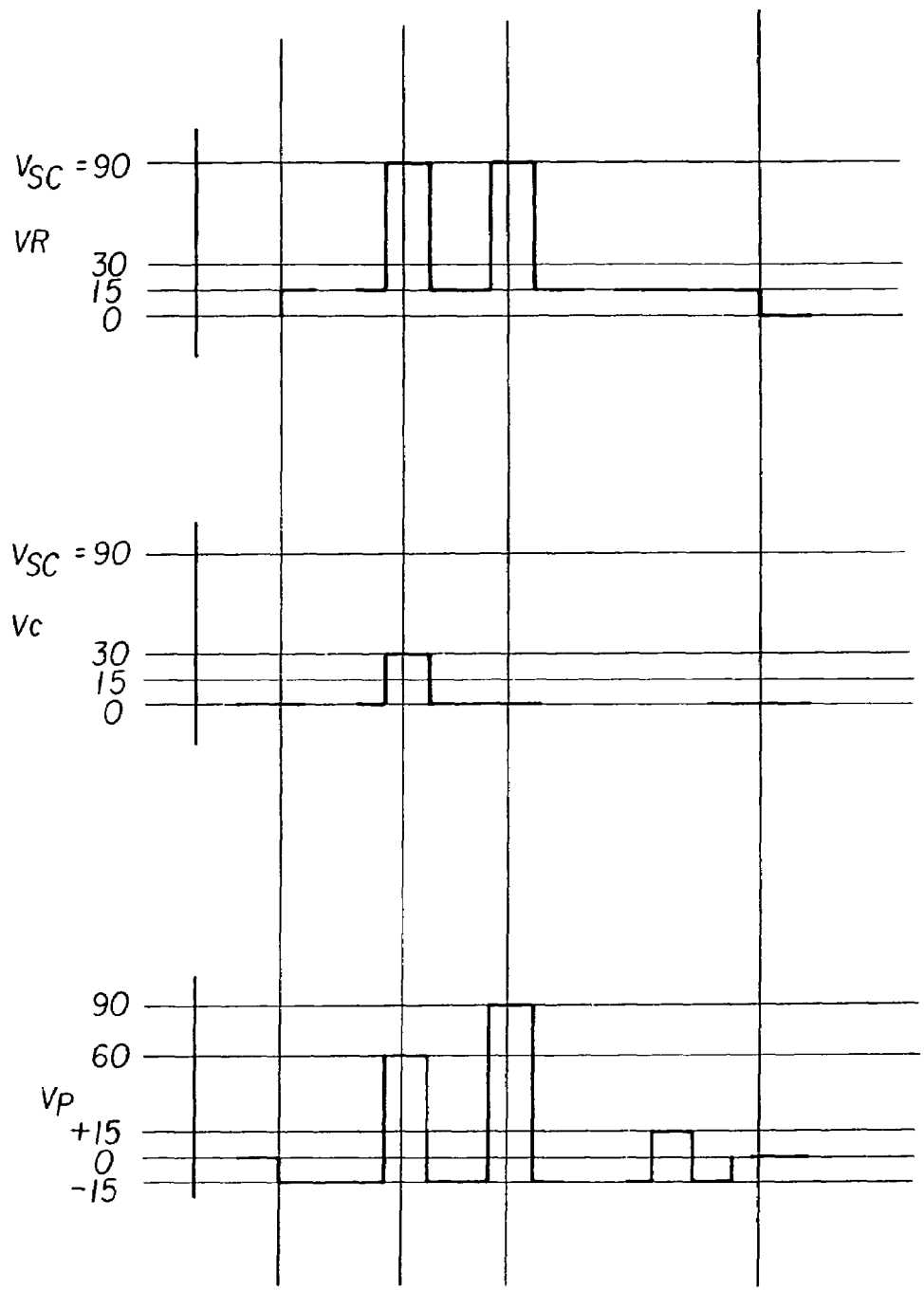
FIG. 11 is a diagram of the waveforms generated by the current invention to drive the display of FIG. 1.

FIG. 11 is a diagram of the waveforms used to write display 10 using the new drive scheme. One output of single driver chip 67 is used to supply a switchable single chip voltage Vsc, in the exemplary embodiment 90 volts, to passive components 70. When display 10 is not being written, single chip voltage Vsc is supplied to passive components 70 kept at ground. When 90 volt is "ON" to supply passive components 70, row voltage VR is shifted to 15 volts. The 15 volts act as the ground state for the writing process. Column voltages Vc being at true ground nominally applies −15 volts potential for pixel voltage Vp. That voltage is below disturbance voltage V1. A row of data is written by switching row voltage VR high to 90 volts. Column voltage Vc is switched to 30 volts to convert cholesteric liquid crystal into the focal conic state (FC) or remains grounded to convert cholesteric liquid crystal into the planar state (P). Unwritten rows held at zero volts until they experience either −15 and +15 volts from column voltage Vc as rows are written. The 15 volt ripple is below disturbance voltage V1, and image data in unwritten rows are not disturbed. At the end of writing, all outputs of single driver chip 67 are set to the ground to the "OFF" state, and no fields are present on display 10.

Figure 12:
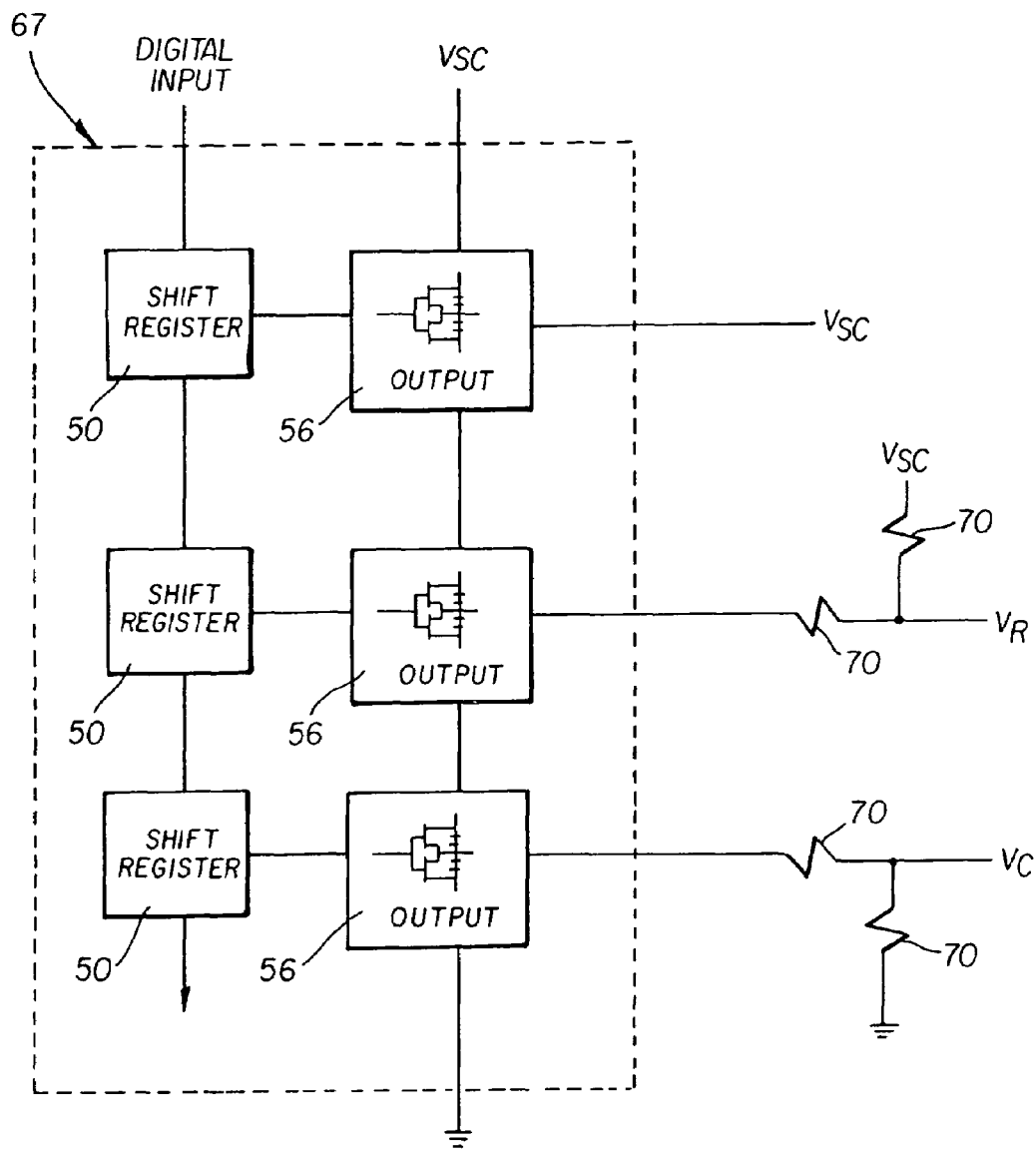
FIG. 12 is detail of a first embodiment of the drive in FIG. 10.

A first configuration of passive components 70 is shown in FIG. 12. Passive components 70 include sets of resistors which act as a voltage divider to provide select output voltages from fixed single chip voltage Vsc. A first set of resistors on each row output causes row voltage VR to switch between 90 and 15 volts. One output of single driver chip 67 supplies single chip voltage Vsc to passive components 70 used to generate row voltage VR. Supplying single chip voltage Vsc through a dedicated output line permits display 10 to be grounded after writing by switching all outputs to ground. A second set of resistors on each column output switches column voltage Vc between 0 and 30 volts. Passive components 70 provide one of two voltages for a column and one of the two voltages for a row from a common fixed single chip voltage Vsc. The voltages supplied to a particular pixel or segment provide a unipolar field that causes such pixel or segment to be in a transparent or reflective state.

Figure 13:
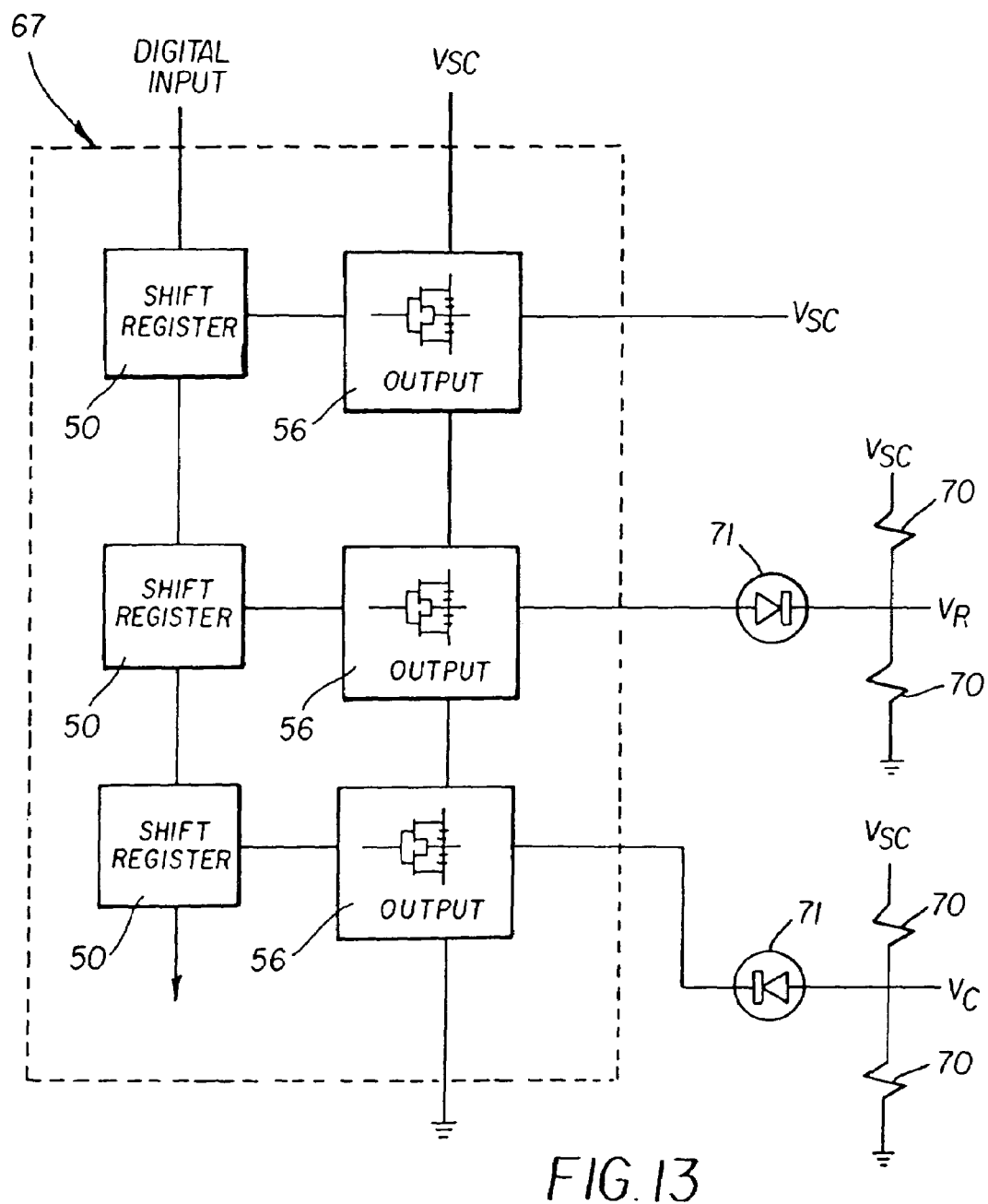
FIG. 13 is detail of a second embodiment of the drive in FIG. 10.

A second scheme using passive components 70 is shown in FIG. 13. The second configuration use a set of resistors and a diode 71 to provide the correct row voltages VR and column voltages Vc. A set of resistors provides the intermediate voltage on each output, and diodes 71 eliminate switching to ground potential for row voltages VR and switching to single chip voltage Vsc for column voltages. The diode configuration permits the drive to be used with displays 10 having high capacitance. With higher display capacitance, the rise and fall time of the applied voltages increases affects display image quality. Replacing each series resistor from the first embodiment with diodes 71 permits fast rise and fall times for displays with high capacitance. In the embodiment having diodes 71, single chip voltage Vsc is be supplied to every set of passive components 70 in this configuration again through one of outputs 56. Switching all outputs 56 to ground will drive display 10 to a zero field state.

The invention has been described in detail with particular reference to certain preferred embodiments thereof, but it will be understood that variations and modifications can be effected within the spirit and scope of the invention.

PARTS LIST

| | |
|---|---|
| 10 | display |
| 12 | card |
| 13 | non-printed area |
| 14 | contacts |
| 15 | substrate |
| 20 | first patterned conductors |
| 21 | etch lines |
| 22 | planar state |
| 24 | focal conic state |
| 26 | incident light |
| 28 | reflected light |
| 30 | polymer dispersed cholesteric layer |
| 32 | connection area |
| 40 | second patterned conductors |
| 42 | dielectric |
| 45 | row |
| 47 | columns |
| 50 | shift registers |
| 55 | switches |
| 56 | outputs |
| 60 | row driver |
| 65 | column driver |
| 67 | single driver chip |
| 70 | passive components |
| 71 | diodes |
| FC | focal conic |
| P | planar |
| V1 | disturbance voltage |
| V3 | focal conic voltage |
| V4 | planar voltage |
| Vc | column voltage |
| VR | row voltage |
| Vp | pixel voltage |
| Vsc | single chip voltage |

What is claimed is:

1. Apparatus for driving a cholesteric liquid crystal display comprising:
  a) the display including cholesteric liquid crystals having a first planar reflective state and a second transparent focal conic state, which are respectively responsive to different applied fields;
  b) an addressing structure having rows and columns of conductors arranged so that when a column and a row overlap, they define a selectable pixel or segment to be viewable or non-viewable;
  c) a switching mechanism operatively coupled to the addressing structure, the switching mechanism being operative to output either a first fixed voltage and a fixed second voltage;
  d) at least one column voltage divider for each column and at least one row voltage divider for each row within the addressing structure, the row and column voltage dividers being responsive to the first and second fixed voltages to provide one of two selectable voltages for each column and one of two selectable voltages for each row; and
  e) a selection circuit operatively coupled to the switching mechanism that selects one of either the first or second voltages in accordance with a predetermined scheme wherein the column voltage divider provides one of two voltages for each column and the row voltage divider provides one of two voltages for each row so that a particular pixel or segment will have an applied voltage that will cause the pixel or segment to selectively be in either a transparent or a reflective state.

2. The apparatus of claim 1 wherein the switching mechanism and the selection circuitry are contained on a single chip.

3. The apparatus of claim 2 wherein the first voltage is a high fixed voltage that serves as the single chip power source.

4. The apparatus of claim 2 wherein the second voltage is a reference voltage for the single chip.

5. The apparatus of claim 1 wherein the voltage dividers further comprise a series of resistors.

6. The apparatus of claim 1 further including means responsive to an input signal for causing the selection of appropriate diodes to provide the appropriate voltage at a selected pixel or segment of the display.

7. A display drive circuit for driving a cholesteric liquid crystal display, the display including cholesteric liquid crystals having a first planar reflective state and a second transparent focal conic state which are respectively responsive to different applied fields, the display further including an addressing structure having rows and columns of conductors arranged so that when a column and a row overlap a pixel or segment is rendered viewable or non-viewable, said circuit comprising:

a switching mechanism operatively coupled to the addressing structure, the switching mechanism being operative to output either of a first fixed voltage and a second fixed voltage, said first fixed voltage and said second fixed voltage being unipolar relative to each other;

at least one column voltage divider for each column and at least one row voltage divider for each row, the row and column voltage dividers being responsive to the first and second fixed voltages to provide one of two selectable voltages for each column and one of two selectable voltages for each row; and a selection circuit operatively coupled to the switching mechanism that selects one of either the first or second fixed voltages to thereby cause the column voltage divider to provide one of the two selectable voltages for each column and the row voltage divider to provide one of the two selectable voltages for each row to thereby cause the pixels or segments to be in a desired one of either transparent or a reflective state.

* * * * *